Oct. 5, 1965  J. E. GLATT  3,209,464

NAVIGATION INSTRUMENT

Filed Sept. 28, 1961

INVENTOR.
Jack E. Glatt,
BY Parker & Carter
Attorneys.

United States Patent Office 3,209,464
Patented Oct. 5, 1965

3,209,464
NAVIGATION INSTRUMENT
Jack E. Glatt, 633 W. Austin St., Park Ridge, Ill.
Filed Sept. 28, 1961, Ser. No. 141,321
7 Claims. (Cl. 33—223)

This invention relates to instruments and has particular relation to an instrument and case therefor.

One purpose of the invention is to provide an instrument and case therefor which shall provide for ready presentation of the instrument data in a plane different from that occupied by the instrument data source.

Another purpose is to provide a navigation instrument for use in underwater navigation.

Another purpose is to provide a navigation instrument which may be viewed by the user in a plane other than that occupied by the data source of the instrument.

Another purpose is to provide an instrument wherein an identical data image is projected for viewing in a plane other than that occupied by the data source of the instrument.

Another purpose is to provide a navigation instrument for underwater navigation having means for insuring a correct course by the user.

Another purpose is to provide an instrument for underwater navigation having means for insuring the accuracy of data presented to the user.

Another purpose is to provide a remote indicating compass having means for insuring the viewer of the correct balancing of the compass at the time of viewing.

Another purpose is to provide a remote reading compass wherein the data presentation may be followed by the user in the same manner as though the compass were read directly.

Another purpose is to provide an instrument wherein a fluid employed in the triple function of partially supporting the instrument, indicating the level relationship of the instrument and in the projecting of an image thereof.

Other purposes will appear from time to time during the course of the specification and claims.

Figure 1:
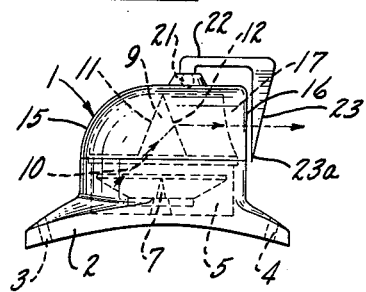
Figure 2:
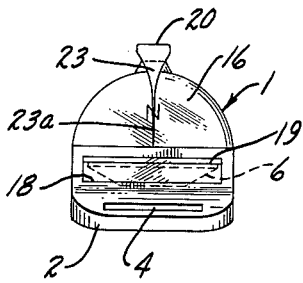
Figure 3:
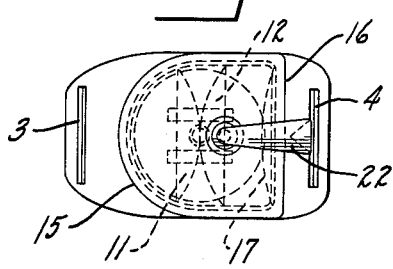
Figure 4:
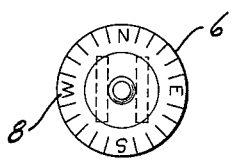
Figure 5:
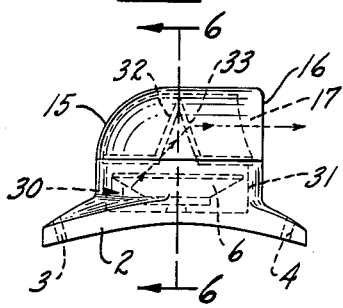
Figure 6:
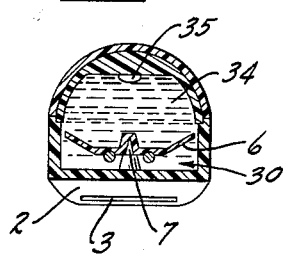

I illustrate my invention more or less diagrammatically in the accompanying drawings, wherein:

FIGURE 1 is a side elevation;
FIGURE 2 is an end view;
FIGURE 3 is a top plan view;
FIGURE 4 is a detail view illustrating the data source of the invention;
FIGURE 5 is a side view illustrating a variant form of the invention; and
FIGURE 6 is a view taken on the line 6—6 of FIGURE 5.

Like parts will be indicated by like numerals throughout the specification and drawings.

Referring now to the drawings, and particularly to FIGURE 1, the numeral 1 generally designates a housing. A base 2 of the housing may be somewhat arcuate in cross sectional configuration to provide for wearing on the wrist of the user when the invention is employed in underwater navigation by so-called "skin" divers. For this purpose, the base 2 is slotted, as indicated at 3, 4 for the reception of a wrist band or strap. It will be realized, however, that a plurality of bases may be employed for the housing 1 without departing from the nature and scope of the invention.

Within housing 1, which may, for convenience, be formed of plastic, is an instrument chamber 5. Mounted within chamber 5 is the instrument data source 6. As illustrated, the data source 6 comprises a dish-shaped compass card balanced rotatably upon a central pin or support 7. As best seen in FIGURE 4, the compass card 6 has appropriate directional indicia imprinted on the inner surface of the outwardly flared or conical side wall 8. As is well-known an indicia "N" will be drawn toward the magnetic pole of the earth.

Positioned above chamber 5 and extending laterally thereacross a distance at least equal to the diameter of member 6 is a prism 9, the dimensions of which, in cross section, substantially comprise an isosceles triangle, the base 10 of which seats upon or may be formed integrally with the roof of chamber 5. A rear face 11 of prism 9 has its base positioned above a point between the support 7 and the lower edge of the wall 8 of member 6, which appears in the left hand portion, as the parts are shown in the drawings, of FIGURE 1.

The housing 1 is generally streamlined in overall configuration, a portion 15 thereof, as best seen in FIGURES 1 and 3, being curved in both the horizontal and vertical planes, to provide for such streamlining, a base or rear wall 16 being generally vertical. Adjacent the roof of housing 1, the wall 16 has a portion 17, an inner surface of which may be curved to form a magnifying lens, the portion 17 being opposed to prism 9 and spaced from wall 12 thereof. The housing 1 encloses a pocket of air, an aid in the proper functioning and readability of the device and productive of a floating capability should the device be lost underwater.

As best seen in FIGURE 2, the wall 16 has, beneath portion 17, a generally rectilinear transparent or window segment 18 in horizontal alignment with the data source member 6. For ease in ensuring the viewer of the correct balance and alignment of member 6, an indicator line 19 may be associated with window 18.

When the instrument is used for underwater navigation, it is important that the viewer not only observe directional data, but that the viewer who is traversing under water be certain that the true course followed corresponds to that reflected by the instrument. Accordingly, I provide a streamlined fin or vane 20. The vane 20 may be conveniently rotatably mounted atop housing 1, as indicated at 21. The member 20 has a generally horizontally disposed segment 22 which is streamlined, having a curved forward end of minimum flat plate area and widening in the direction of wall 16, as indicated best in FIGURE 3. The portion 22 extends from atop housing 1 to a point beyond the wall 16, and an indicating or lubber line portion 23 depends or extends downwardly from the portion 22. As best seen in FIGURE 2, it will be observed that the portion 23 is progressively reduced so that a terminal portion 23a, which overlies the segment 17 through which the data is presented to the viewer, forms in effect a "lubber" line insuring the viewer that the course being followed at the time of viewing corresponds to that beneath the line 23a.

Referring now to FIGURE 5, I illustrate a variant form of the invention in which a chamber 30 is formed in the housing 1 and located substantially in the position occupied by chamber 5, as illustrated in FIGURE 1. The chamber 30 has a generally rectilinear or box-like lower portion 31 in which the members 6 and 7 are mounted in much the same manner as is illustrated in FIGURE 1. The upper wall, however, of chamber portion 31, is interrupted at the location occupied by the base 10 of prism 9 in FIGURE 1. A pair of upper wall portions 32, 33 are arranged in an inverted V, with the open end thereof occupying the said location of base 10 and with the converging walls 32, 33 occupying substantially the position of wall surfaces 11, 12 of prism 9 in FIGURE 1. A fluid 34 fills the chamber portion 31 to support and protect the instrument data source 6 against shock and vibration and also fills the space defined by the converging walls 32, 33 to serve the additional or dual function of a prism, the fluid 34 being of a variety of available compositions, the light refraction characteristics of the fluid 34 being substantially equal to that of the material forming prism 9.

Indicated at 35 is a quantity of air or "bubble" entrapped in fluid 34 within the air-and-fluid-tight chamber 30. The bubble 35 rises until it contacts the joined upper edges of walls 32, 33 and acts in the manner of a spirit-level to indicate to the viewer that the instrument and case is level at the time of viewing, the bubble 35 appearing in alignment with the directional indicia presented at 17 and with lubber lines 23a.

The use and operation of my invention are as follows:

Considering the instrument as an underwater navigation compass worn by a skin diver, the diver secures the instrument to the wrist in the manner of a wristwatch. The diver is enabled to view the instrument card without changing the position of his head as he moves through the water. It is necessary only that the arm be positioned before the face of the diver with the wall 16 presented. Since the forward portion of the compass card 6 will be read directly through prism 9 and magnifier 17, the diver gets a true and correct reading. It will be noted that the other directional indicia on member 6 are in the correct position with respect to the known magnetic headings. For example, in the drawings, the indicated course is "North." With the "N" presented through magnifier 17, it will be observed that the indicia for "East" is to the right and for "West" to the left which is, of course, the proper relationship. Similarly, if the diver should observe the instrument as it appears, for example, in FIGURE 2, and the diver wished to proceed East, he would simply turn to the right, the same being the correct direction of turn and the "E" on member 6 would move to a position beneath the lubber line 23a, as the diver completed his turn.

There is presented to the diver, immediately adjacent the presentation of the compass or directional indication, a side view of the compass card 6. The same is presented in relation to a line properly positioned to indicate the correct balanced position of the card 6. By merely glancing at this, the diver is assured that the reading being presented immediately above the window 18 is a correct one and the card is properly balanced and indicated. On occasion, the diver may employ the pitch or aft-forward tilt of the member 6, as shown through window 18, to indicate the fact that the diver, assuming that the wrist has been held in a constant position, is diving or rising and the bank of the member 6 may indicate that the diver has tilted to left or right.

The member 20 is pivoted upon housing 1 and streamlined to automatically align itself with the course through the water of the diver. If the arm of a diver should not be held directly perpendicular to the course being followed, it would be possible for a diver to consistently read the same heading through lens 17 while the diver was nonetheless making a true course through the water of something different from the direction indicated through lens 17. When the member 20 is available, with its lubber line portion 23a overlying at least a part of the lens 17, the diver need only insure that the portion 23a is centered on the lens 17, whenever a directional reading is taken to be certain of the course then being followed. By consistently maintaining the portion 23a in alignment with a selected course or directional indication appearing through lens 17, the diver can be assured of following a correct predetermined true course.

In FIGURE 5, a somewhat varied form of the invention appears wherein a fluid 34 serves a triple function. The movement of the instrument 6 is dampened by the fluid 34 and member 6 is protected by the fluid 34 from injury due to sudden acceleration or deceleration or to shock or vibration. At the same time a portion of said fluid is held above the main body thereof within the converging laterally disposed walls 32, 33. Since the fluid selected will have a light refraction characteristic substantially identical to that of the material forming the walls 32, 33, the same material, which may conveniently be one of the many forms of plastic, having been employed in prism 9, the supply of fluid within the roof formed by walls 32, 33 will project the card indicia in a direct reading, rearwardly through the vertical area 17.

A bubble 35 trapped in fluid 34 provides an automatic indication of the level relationship of the instrument and case and is presented to the viewer simultaneously with the directional indicia and the course guiding member 20 which may be employed with the device of FIGURES 5 and 6.

Whereas I have shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. For example, while the instrument of the invention is illustrated in association with an underwater navigation function, and while the invention has particular advantages in connection therewith, it will be understood that many features of the invention may be employed in association with other types of instruments, and in connection with compasses and other instruments utilized in environments other than underwater. The scope of the invention should, therefore, be limited only by the scope of the hereinafter appended claims.

I claim:

1. In an instrument a housing, a chamber in said housing, an instrument data source in said chamber, a supply of fluid in said chamber surrounding and in contact with said data source, said chamber having a roof, a portion of said roof lying in upwardly converging planes, said fluid filling said chamber and in contact with all portions of said roof, said roof being formed of transparent, light refracting material, said fluid having a light refracting characteristic substantially equal to that of said material, said converging roof portions being positioned to acquire an image of a portion of said data source and to project said image outwardly of said chamber.

2. An instrument comprising a housing, a data source mounted in said housing for rotation about a substantially vertical axis, said data source having an upwardly inclined peripherial edge area and indicia disposed within said area, a prism having upwardly, equi-dimensional, converging sides and a bottom area fixedly positioned above and with respect to said data source, said bottom area being centered over the center of said data source, said housing having a transparent wall spaced from, but in visual alignment with, one of the converging walls of said prism whereby the indicia on said data source is projected through said prism for direct reading through the transparent wall of said housing.

3. An instrument as defined in claim 2 wherein said wall comprises a viewing wall disposed generally parallel to the axis of rotation of said data source and the remainder of the housing is curved in two planes to define a streamline shape toward said viewing wall.

4. An instrument as defined in claim 2 wherein said housing is provided with a pivoted vane member said last mentioned member being freely moveable about an axis parallel to the axis of rotation of said data source and covering a narrow portion of the transparent wall of said housing to define a reference line with respect to indicia readable through said transparent wall.

5. An instrument comprising a housing, a freely rotatable data source including an upwardly inclined peripheral area mounted for rotation about a vertical axis positioned within said housing, said housing being provided with at least a partially transparent wall; means comprising an isosceles prism disposed above said data source and having a base in centered relation with the data source to transmit information from the peripheral area of said data source through the transparent area of said wall in the same relative position as said information is transmitted from said area to said means; and a vane member pivotally mounted on said housing for free movement about an axis parallel to the axis of rotation of said data source, said vane member having a tapered configuration from its connection point with said housing to its terminal end so as to respond to the passage of fluid over and around the housing by alignment with said transparent portion of said wall in a position indicative of the direction of movement of said fluid, the terminal end of said vane comprising a thin fin overlying a narrow portion of the transparent portion of said wall to define a reference line for data transmitted through the transparent portion of said wall.

6. An instrument as defined in claim 5, wherein said partially transparent wall comprises a viewing wall disposed generally parallel to the axis of rotation of said data source and the remainder of said housing is curved in two planes to define a streamlined shape toward said wall.

7. In an instrument a housing; a chamber in said housing and an instrument data source in said chamber; said data source having an upwardly directed peripheral area having data thereon; said chamber having a roof; a solid prism having a bottom wall and converging equi-dimensioned sides supported by the roof of said chamber and positioned over the center of said data source, said prism being formed of transparent, light refracting material; at least the portion of the roof of said chamber underlying the bottom of the prism being transparent; said housing also surrounding said prism and including a generally flat, transparent wall spaced from one of the converging equi-dimensional sides of the prism whereby the peripheral area of said data source may be viewed through said transparent wall, the data thereon appearing in the same relative position as if viewed directly on said data source.

References Cited by the Examiner

UNITED STATES PATENTS

| | | | |
|---|---|---|---|
| 1,068,169 | 7/13 | Ricketts | 73—188 |
| 1,336,925 | 4/20 | SaKauye | 73—188 |
| 1,431,776 | 10/22 | Colvin | 33—223 |
| 1,737,487 | 11/29 | Wunsch | 33—222 |
| 1,961,068 | 5/34 | Mix | 33—222 |
| 2,177,218 | 10/39 | Klein | 33—223 |
| 2,857,679 | 10/58 | Le Bleu | 33—72 |
| 2,909,845 | 10/59 | Mikesell | 33—222 |
| 3,041,917 | 7/62 | Glatt | 33—222 X |

FOREIGN PATENTS

| | | |
|---|---|---|
| 58,840 | 7/41 | Denmark. |
| 7,926 | 1909 | Great Britain. |
| 16,960 | 7/06 | Great Britain. |
| 303,758 | 12/32 | Italy. |
| 330,803 | 10/35 | Italy. |

ISAAC LISANN, *Primary Examiner.*